United States Patent [19]

Benedetti, Jr. et al.

[11] Patent Number: 5,641,011

[45] Date of Patent: Jun. 24, 1997

[54] SYSTEM FOR TRANSPORTING AND DISPENSING GRANULAR MATERIALS

[75] Inventors: Albert M. Benedetti, Jr.; Paul A. Nolte, both of Memphis, Tenn.

[73] Assignee: Ingersoll-Dresser Pump Company, Liberty Corner, N.J.

[21] Appl. No.: 394,076

[22] Filed: Feb. 24, 1995

[51] Int. Cl.⁶ ........................ B65B 1/00
[52] U.S. Cl. .......... 141/346; 141/95; 141/198; 141/348; 141/351; 137/614.02; 251/149.1; 239/69; 239/650; 222/518
[58] Field of Search ............ 141/351–355, 141/360–362, 95, 198, 346–350; 137/614.02–614.06; 251/149.1, 149.3; 239/69, 148, 585.1, 585.5, 590.3, 650; 222/52, 509, 518

[56] References Cited

U.S. PATENT DOCUMENTS

| | | | |
|---|---|---|---|
| 1,475,341 | 11/1923 | Hanson | 141/360 X |
| 1,635,160 | 7/1927 | Bergmann | 141/360 |
| 3,123,107 | 3/1964 | Kappler | 141/352 |
| 3,318,529 | 5/1967 | Ferm et al. | 239/69 |
| 3,970,123 | 7/1976 | Poulton et al. | 141/351 |
| 4,592,397 | 6/1986 | Mitzner | 141/95 X |
| 4,597,531 | 7/1986 | Kise | 239/650 |
| 4,971,255 | 11/1990 | Conrad | 239/650 |
| 4,972,887 | 11/1990 | Hacknauer et al. | 141/352 X |
| 4,991,632 | 2/1991 | Nordmeyer et aal. | 141/95 X |
| 5,029,624 | 7/1991 | McCunn et al. | 141/351 X |
| 5,076,497 | 12/1991 | Rabitsch et al. | 239/590 X |
| 5,127,450 | 7/1992 | Saatkamp | 141/95 X |
| 5,144,992 | 9/1992 | Jaerger et al. | 141/346 |
| 5,263,521 | 11/1993 | Brossard et al. | 141/346 X |
| 5,490,546 | 2/1996 | Lhoest | 141/346 |

*Primary Examiner*—J. Casimer Jacyna
*Attorney, Agent, or Firm*—Robert F. Palermo

[57] ABSTRACT

A system for transporting and dispensing fluent materials consists of a shipping container disposed with a supply of fluent material, and having a bottom wall with an outlet aperture, the outlet aperture being occluded by a normally disabled transfer valve; a base container adapted for sealed attachment to the bottom wall of the shipping container, the base container having a top wall equipped with a means for enabling the normally disabled transfer valve, when the base container is properly attached to the shipping container, and a bottom wall which tapers downwardly to an opening with a valve for dispensing particulate material at a controlled rate when the valve is opened. A remotely operable metering valve is also disclosed as a substitute for the valve in the base container opening.

10 Claims, 6 Drawing Sheets

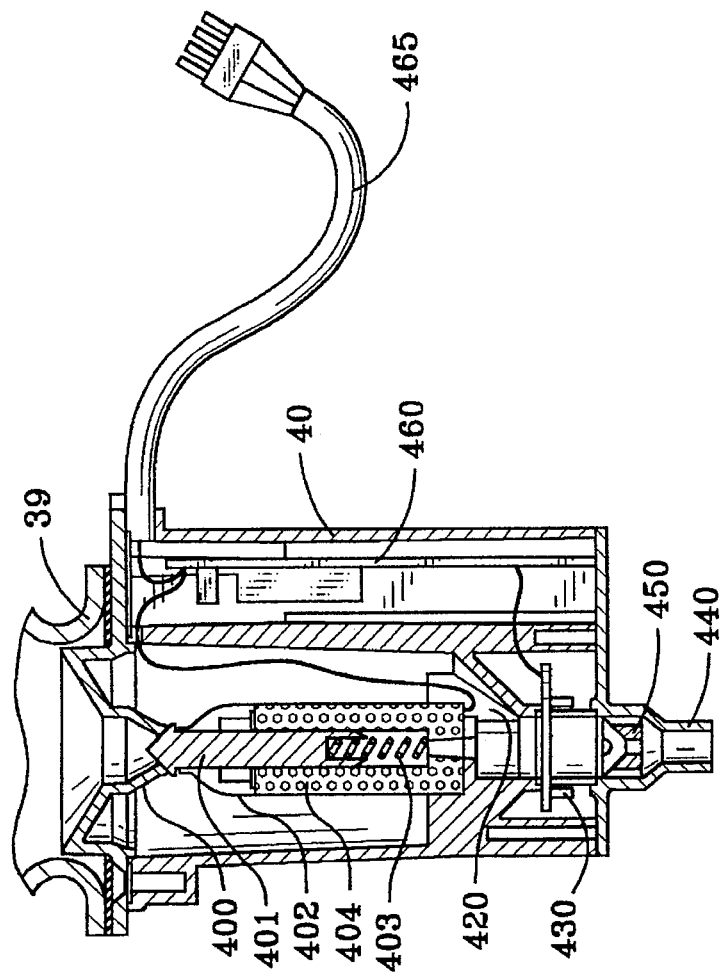
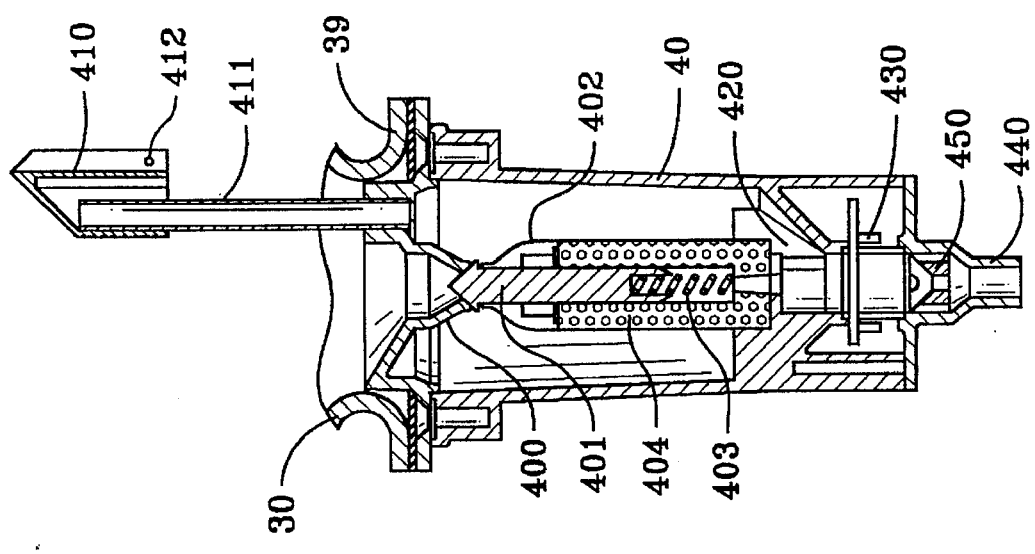
FIG. 5a
FIG. 5

SYSTEM FOR TRANSPORTING AND DISPENSING GRANULAR MATERIALS

BACKGROUND OF THE INVENTION

This invention relates generally to handling equipment for particulate materials and more particularly to a spill-resistant system for transporting and dispensing hazardous granular or particulate materials.

In operations requiring hazardous chemicals or other noxious substances, the Environmental Protection Agency and other regulatory bodies are imposing stricter regulations on the transportation, handling, application, disposal, and reporting of actual usage of chemicals. These regulations, along with public health concerns, have generated a need for products and systems which address proper handling of hazardous chemicals.

To reduce the bulk quantity of chemicals handled, the applied concentration of the chemicals has been increased. This has raised the cost of chemicals per unit weight and has also required more accurate dispensing systems. For example, typical existing systems for dispensing agricultural pesticide use a mechanical chain driven dispenser. Normal wear and tear on such mechanical dispensers can alter the application rate of pesticide by as much as 15% and lead to application variations of that magnitude within a single row or field. This represents a very significant cost penalty, even if all the pesticide is deposited on the fields; because any excess application is wasted, and any insufficient application is ineffective and, therefore, also wasted.

In addition to the excessive dispensing losses described, a small amount of pesticide may be spilled while opening the chemical container, while pouring the chemical into the dispensing equipment, or while connecting and disconnecting the chemical transport containers and the dispensing equipment when the unit is so equipped. Even a small quantity of accidently dispensed chemical may result in a significant cost penalty; because the toxicity of pesticides may result in serious environmental damage and in adverse health consequences for exposed persons.

The foregoing illustrates limitations known to exist in present chemical transporting and dispensing systems, and it would be advantageous to provide an alternative directed to overcoming one or more of these limitations. Accordingly, a suitable alternative is provided including features more fully disclosed hereinafter.

SUMMARY OF THE INVENTION

In one aspect of the present invention, this is accomplished by providing a system for transporting and dispensing fluent materials comprising a shipping container disposed with a supply of fluent material, and having a bottom wall with an outlet aperture, said outlet aperture being occluded by a normally disabled transfer valve; a base container adapted for sealed attachment to the bottom wall of said shipping container, said base container having a top wall equipped with a means for enabling said normally disabled transfer valve, when said base container is properly attached to said shipping container, and a bottom wall which tapers downwardly to an opening with a valve for dispensing particulate material at a controlled rate when said valve is opened.

The foregoing and other aspects will become apparent from the following detailed description of the invention when considered in conjunction with the accompanying drawings.

BRIEF DESCRIPTION OF THE DRAWINGS

FIG. 4 is an end elevational cross-sectional schematic view of the base container and dispensing valve shown in FIG. 3a;

FIGS. 5 and 5a are side and end elevational cross-sectional schematic views, respectively, showing details of the bottom mounted dispensing valve for particulate material.

DETAILED DESCRIPTION

Figure 1:
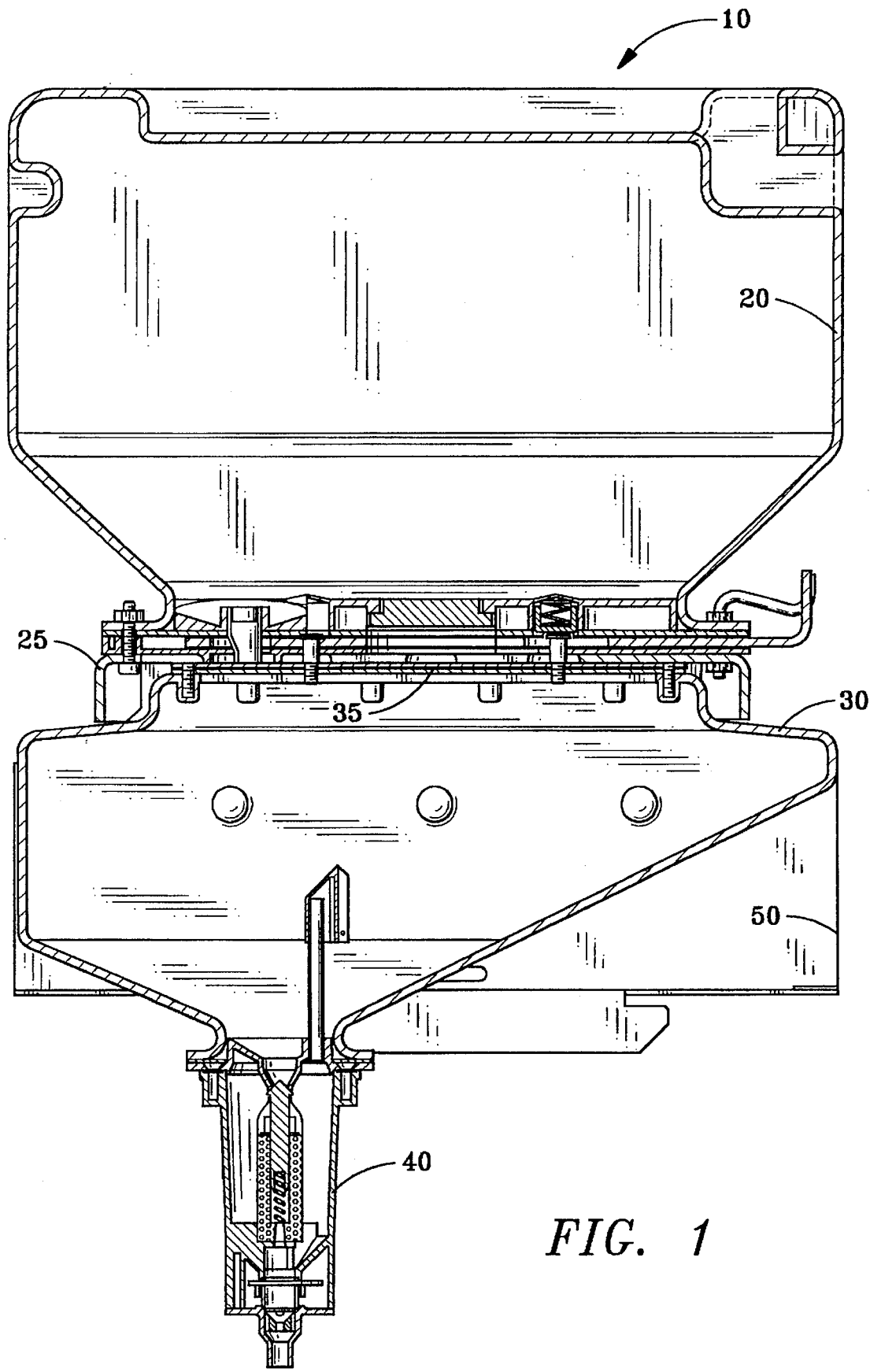
FIG. 1 is a side elevational cross-sectional schematic view of a material dispensing system incorporating the present invention.

FIG. 1 shows the overall configuration of the chemical shipping and dispensing system 10 of the present invention. In its operating condition, the system is arranged with the shipping container 20 on top of the base container 30 and the material transfer valve assembly 25 in its enabled and opened state due to the action of the transfer valve enabling means 35 of base container 30. Dispensing valve 40 is mounted at the bottom of base container 30 such that, when operational, the system comprises a unitary vertical assembly of the shipping container 20, base container 30, and dispensing valve 40. The assembly 10 is mounted in a cradle 50 which is part of a farm implement (not shown) used for planting, fertilizing, or otherwise treating croplands or other fields. The assembly 10 may be used singly or as one of an array of twenty or more such dispensers mounted on a single implement. When assembled as shown, the granular chemical flows downwardly from the shipping container 20 through the enabled transfer valve 25, through the enabling means 35 (which also has a seal to close its top surface when not connected to the shipping container), into base container 30, and finally through dispensing valve 40 when the valve is opened. It should be noted that, when not mounted on base container 30, and when transfer valve 25 is not securely engaged with enabling means 35, the transfer valve is locked (or disabled) in the closed position. Also, in the same circumstances, the base container is closed as will be described later in greater detail.

Figure 2:
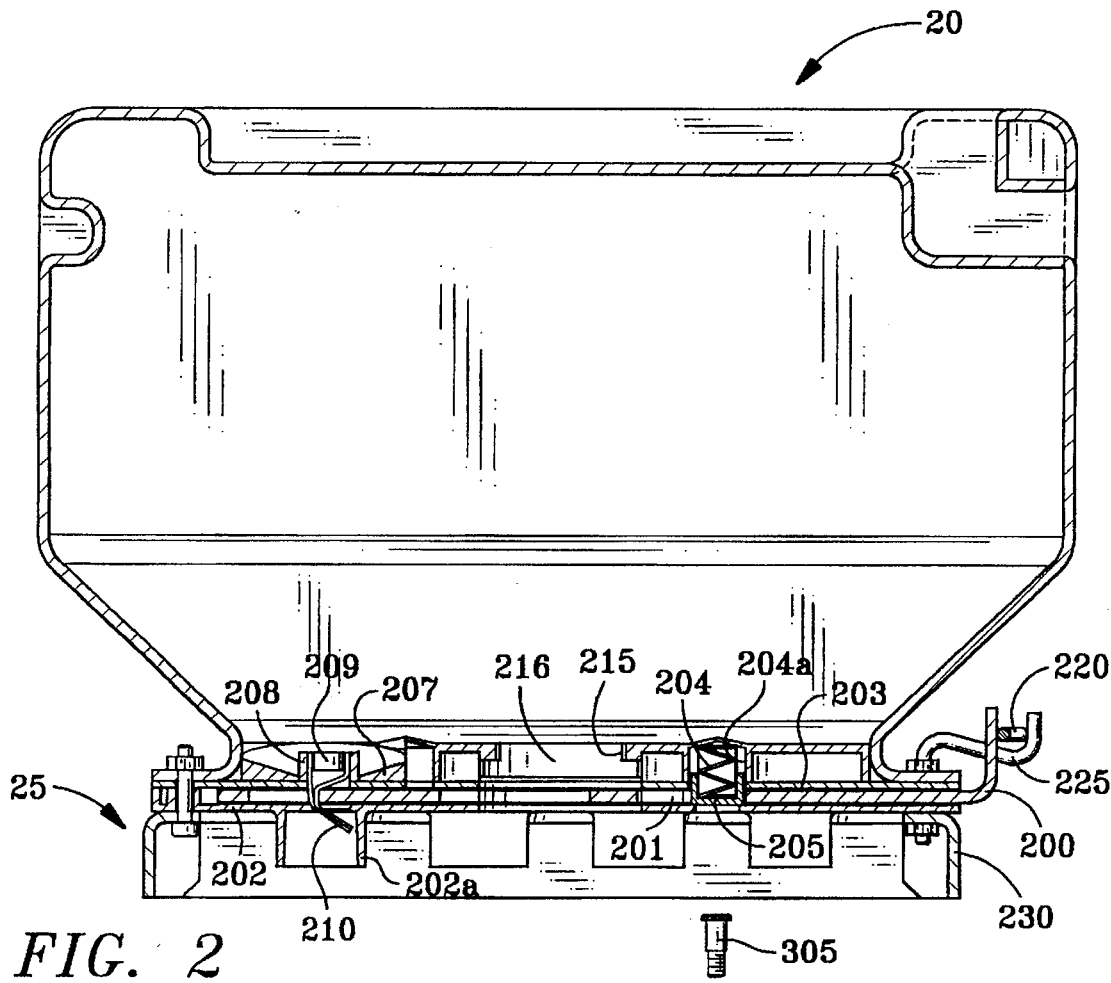
FIG. 2 is a side elevational cross-sectional schematic view showing the shipping container of the present invention and the normally disabled material transfer valve assembly in its bottom wall.
Figure 2A:
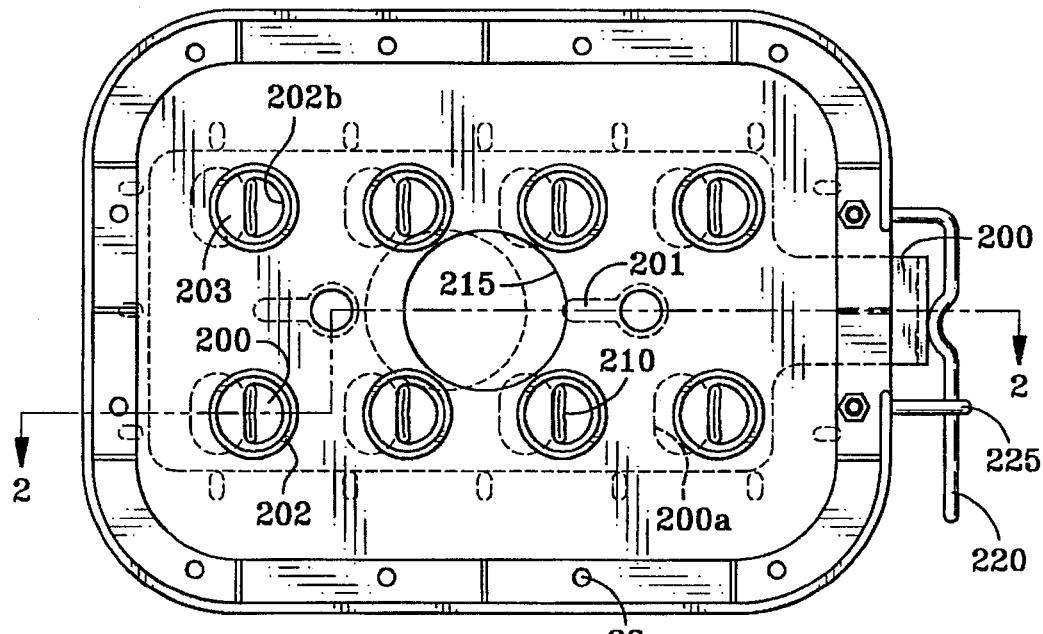
FIG. 2a is a bottom view of the shipping container showing some details of the transfer valve assembly in its closed and disabled state.

FIGS. 2 and 2a show further details of shipping container 20 and transfer valve 25 in side and bottom views. Transfer valve assembly 25 is mounted by fasteners 22 to a mounting flange 21 of shipping container 20 and comprises a filling port 215 in top plate 203 which is sealed by plug 216. Top plate 203 also has a plurality of funnel shaped recesses 207 in which bosses 208 are disposed for clamping soft rubber or polymer tubes 210 by means of clamp rings 209, the tubes extending downwardly almost to the bottom of protective leg frame 230 through slide plate 200 and through downwardly extending bosses 202a in bottom plate 202. The holes 202b in bottom plate 202 are "D"-shaped to coact with flat-sided holes 200a in slide plate 200 to pinch and close the tubes 210 when the slide plate is in the closed position. Slide plate 200 also has two keyhole-shaped slots 201, placed to receive lock pins 205 in their circular ends, the lock pins projecting from recesses 204a under bias loading from springs 204.

Shoulder bolts 305 (actually one of two) are mounted on base container 30 and enable transfer valve 25, when shipping container 20 is mounted on base container 30, by displacing lock pins 205 from the circular locking portions of slots 201 thereby disengaging the locking feature. When the locking feature is thus disengaged and locking arm 220 is disengaged from the locking arm catch, slide plate 200 is free to slide to an open position; because the heads of shoulder bolts 305 are above slide plate 200 and the shoulder portions of bolts 305 permit the narrow portions of slots 201 to slide past. A spring (not shown) may be included to bias slide plate 200 to the closed position together with a lock-open catch (also not shown). In the embodiment illustrated, as long as the two containers 20 and 30 are connected, the slide valve 200 is free to move, but the containers cannot be separated; because the heads of shoulder bolts 305 will not pass through the narrow portions of slots 201. Leg frame 230 is provided to protect tubes 210 and bosses 202a while also providing a flat bottom for resting the container during handling.

Figure 3:
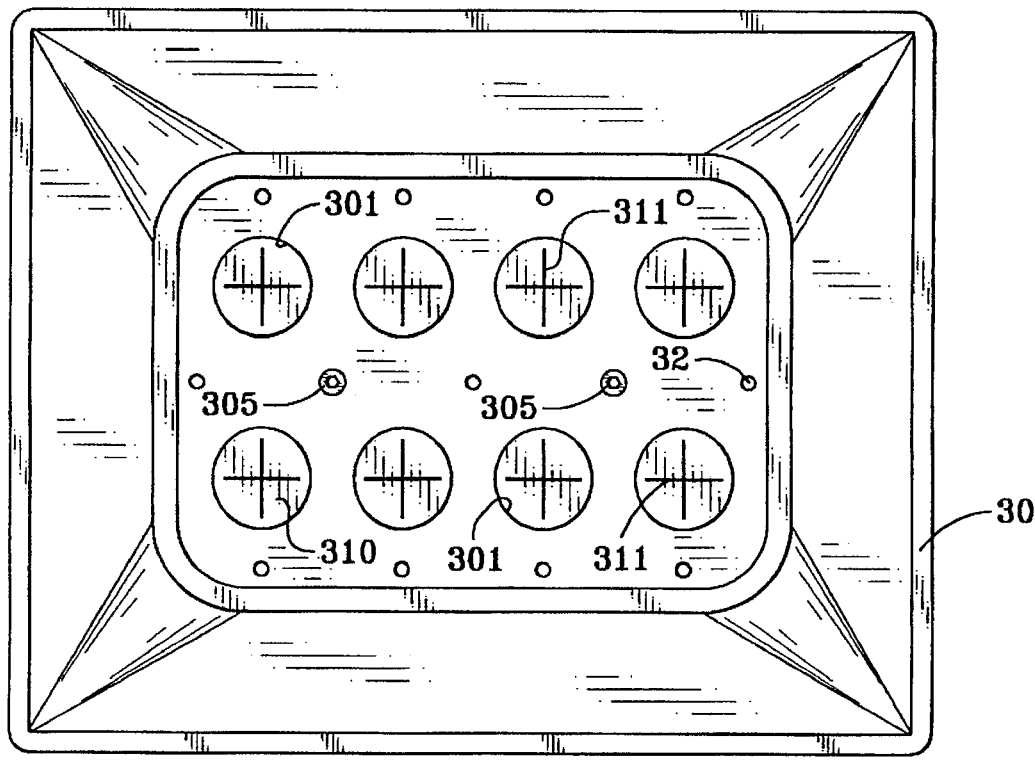
FIG. 3 is a top view of the base container showing the means for enabling the transfer valve of the shipping container.
Figure 3A:
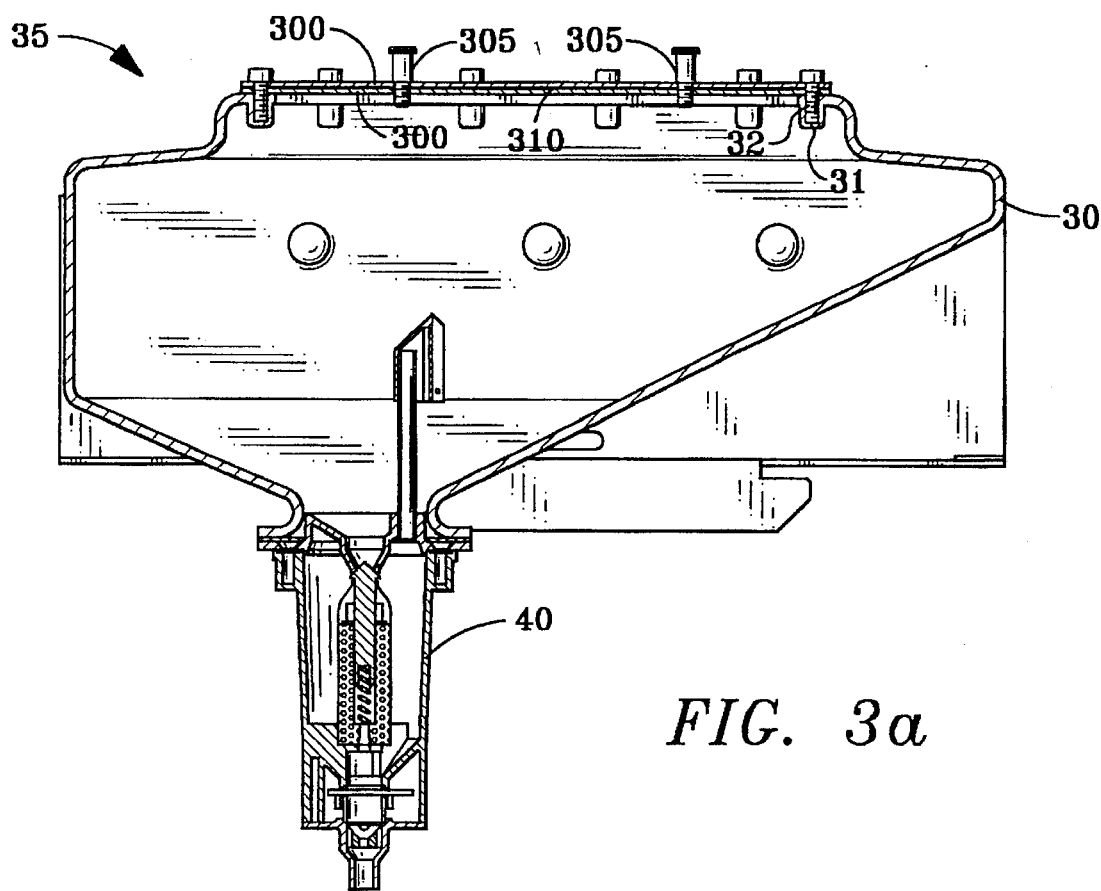
FIG. 3a is a side elevational cross-sectional schematic view of the base container showing the means for enabling the transfer valve and the bottom mounted dispensing valve for particulate material.
Figure 4:
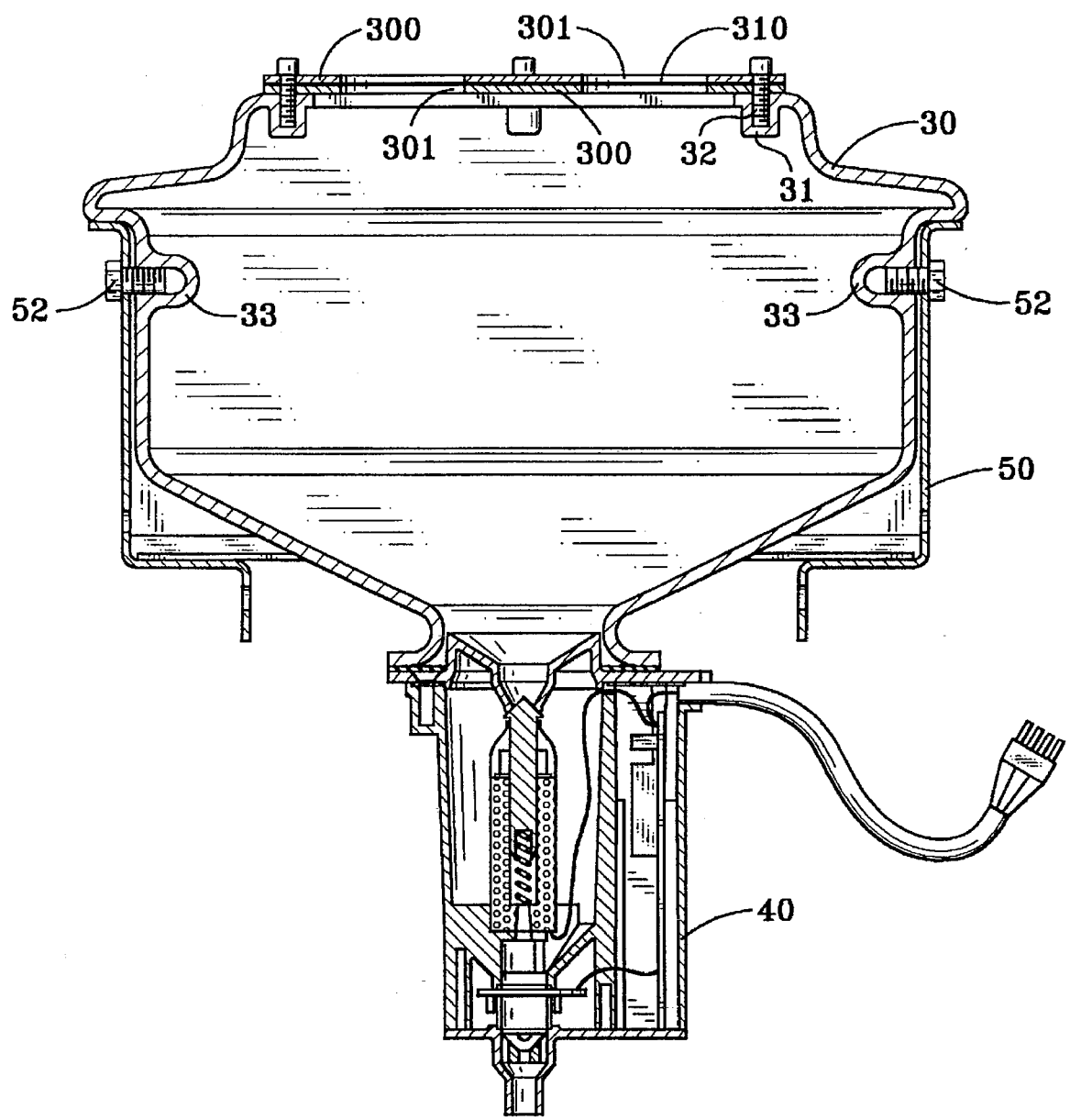

FIGS. 3, 3a, and 4 show a top view, a cross-sectional side view, and a cross-sectional end view, respectively, of the base container 30. Enabling means 35 comprises upper and lower plates 300, a soft rubber or polymer sheet 310 sandwiched between the upper and lower plates 300, and fasteners 32 clamping the enabling means components together and to base container 30 at attachment bosses 31. Plates 300 each have a plurality of holes 301 (in this embodiment—8) aligned with each other and occluded by sheet 310 which has crossed slits 311 centered in each hole 301. Normally the edges of crossed slits 311 are together in a closed position, but when attached to the transfer valve of the shipping container, are easily separated by the soft tubes 210 and bosses 202a to allow the granular chemicals to flow into the base container. When the containers are separated, slots 311 close again to keep out dust and light rain. It is preferred to use a flat cap across the top of the base container during storage to prevent contamination of the container. From this, it can be seen that shoulder bolts 305 are located and project upwardly a sufficient distance to disengage the lock pins and to enable the transfer valve on the shipping container.

FIGS. 5 and 5a show side and end cross-sectional views of the dispensing valve 40. The valve 40 is shown here as being attached to a flange 39 on the bottom of the base container. Other methods of mounting, including integrally molding into the base container, may be used without compromising the function of the dispensing valve.

Level sensor 410 projects up into the base container 30 and has an electric eye 412 for sensing the level of chemical granules in the base container to warn of a low condition and thereby allow interruption of the application to change shipping containers without leaving part of the field untreated or losing track of the location of a run-out. At the top of valve 40 is an inlet seat 400 which is occluded by a solenoid operated valve stem 401, which is spring biased to a closed position by spring 403. A bellows seal 402 shields the solenoid coil 404 from the chemical during operation. When the valve stem 401 is retracted from seat 400, the chemical flows downward to outlet 420 where it is sensed by flow sensor 430. This provides warning of blockages or other flow interruptions and allows for timely correction thereof. The solenoid valve stem 401 is intermittently opened depending upon the travel speed of the implement and the dosage desired per unit area. This could lead to intermittent dispensing of the chemical. To prevent such intermittent dispensing, a flow diffuser 450 is incorporated to maintain a steady and uniform flow without pulsations as the chemical flows through the discharge nozzle 440.

Electronic monitoring and control is provided by an integrated circuit signal processing board 460 which receives control signals from a computer controlled chemical dispensing module on the implement through signal cable 465. The module receives input of the desired dosage of chemical per unit area and, using that together with implement travel speed and feedback signals of granular chemical flow regulates the solenoid controlled valve to yield the desired dosage. Board 460 collects feedback signals from level sensor 410 and flow sensor 430 and sends them back through cable 465 to the control module for real time monitoring and control of the chemical dispensing operation. The cycling time of the solenoid valve stem 401 is thus adjusted according to the programmed dispensing profile and chemical deposition is maintained within a close tolerance at the desired dosage.

Figure 6:
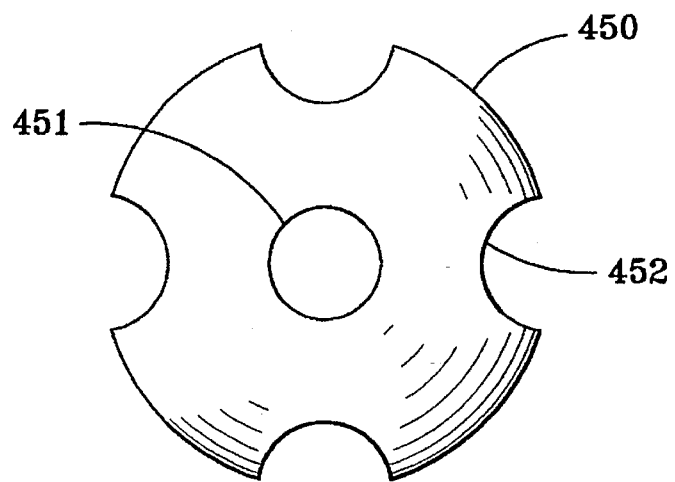
FIGS. 6, 6a, and 6b are plan, elevation, and sectional elevation views of the diffuser in the metering and dispensing valve of the present invention.
Figure 6A:
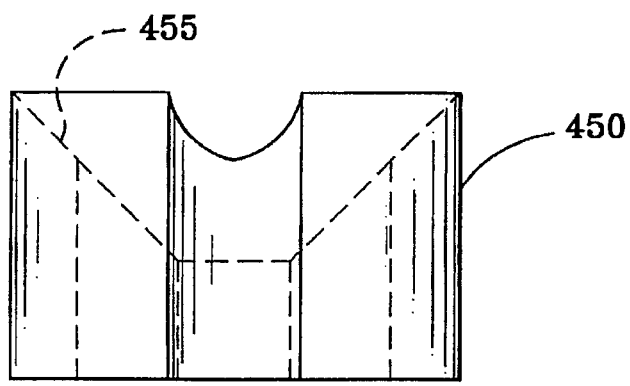
Figure 6B:
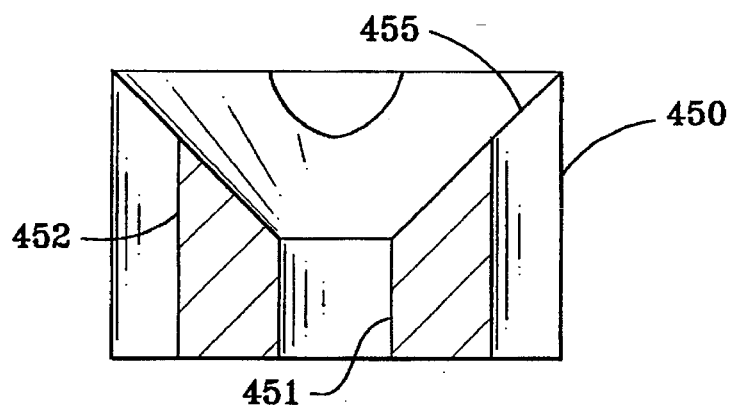

FIGS. 6, 6a, and 6b show top plan, side elevation, and sectional elevation views of the flow diffuser 450 which is mounted in the discharge nozzle 440 of the metering dispensing valve 40. It is a substantially disc-shaped piece with a funnel-like top surface 455, a centered vertical axial bore 451, and a plurality of symmetrically placed axial flutes 452 about its periphery. In operation, the granular material impinges on the top of the diffuser and is directed to the axial center bore 451 by the top surface 455. The fluted recesses 452 in the periphery of the diffuser 450, together with the axial center bore 451, provide the steady flow to eliminate pulsations due to cycling of the solenoid and to still allow the wide variation in flow required for different applications.

The invention, thus, comprises a system for transportation and dispensing of granular chemicals having a shipping container with a normally disabled transfer valve, a base container with means for enabling the transfer valve, a metering dispensing valve with a level sensor to sense material level in the base container, a solenoid operated valve stem, a flow sensor to monitor flow of material to the discharge nozzle, a diffuser to smooth the flow rate of material to eliminate pulsations due to cycling of the solenoid, and an electronically controlled monitoring and regulation system.

What is claimed is:

1. A system for transporting and dispensing fluent particulate materials comprising:

a shipping container disposed with a supply of fluent particulate material, having a bottom wall with an outlet aperture, said outlet aperture being occluded by a normally disabled transfer valve;

a base container adapted for sealed attachment to the transfer valve which occludes the outlet aperture in the bottom wall of said shipping container, said base container having a top wall equipped with a sealing cover having means for enabling said normally disabled transfer valve, when said base container is properly attached to said shipping container, and for receiving material from said shipping container when said enabled transfer valve is opened by moving a slide plate to an open position, and a bottom wall which tapers downwardly to an opening having a valve for dispensing particulate material at a controlled rate when said valve is opened wherein said normally disabled transfer valve is attached to said shipping container and comprises:

a top plate, a bottom plate, and said slide plate slidably interposed therebetween, said top plate, said slide plate, and said bottom plate each having a plurality of holes for permitting transfer of material from said shipping container to said base container when said slide plate is in a first open position; and means for locking said slide plate in a second closed position, said means for locking being always engaged with said slide plate, thereby disabling said transfer valve, when said shipping container is not attached to said base container.

2. The system of claim 1, wherein said base container comprises:

a vessel having a top wall with an inlet aperture and a tapered bottom wall for directing material to a dispensing aperture;

means for sealing said inlet aperture and for enabling said transfer valve; and a dispensing valve attached to said vessel below said dispensing aperture for receiving fluent material from said vessel and for controllably dispensing said fluent material.

3. The system of claim 2, wherein the means for covering said inlet aperture and for enabling said transfer valve comprises:

a top plate and a bottom plate, each having a plurality of holes for receiving fluent particulate materials from said shipping container;

a flexible membrane interposed between said top and bottom plates and having a plurality of slits aligned with said plurality of holes in the plates, said slits being closed except when said base container is attached to said shipping container; and at least one shoulder bolt projecting upwardly from said top plate in alignment with said circular portion of the keyhole-shaped slot in said slide plate and with the at least one lock pin projecting from the top plate of the transfer valve under a spring bias.

4. The system of claim 1, wherein the means for locking said slide plate in a closed position comprises:

at least one lock pin projecting from the top plate under a spring bias, said pin engaging a circular portion of a keyhole-shaped slot in said slide plate when said slide plate is in a closed position occluding the holes in the top and bottom plates.

5. The system of claim 4, wherein the means for enabling said normally disabled transfer valve comprises:

at least one shoulder bolt projecting upwardly from said base container top wall, said shoulder bolt engaging said lock pin and pushing said lock pin out of engagement with said slide plate, thereby enabling said transfer valve by permitting the slide plate to slide, the shoulder bolt having a neck capable of fitting in a narrow portion of said keyhole-shaped slot.

6. The system of claim 4, wherein the means for enabling said normally disabled transfer valve further comprises:

a head on said shoulder bolt projecting above said slide plate and above the narrow portion of said keyhole-shaped slot in said slide plate when said slide plate is in the open position, thereby preventing separation of the transport container and base container when the transfer valve is open.

7. The system of claim 1, further comprising:

means for biasing said slide plate to said second closed position.

8. The system of claim 7, further comprising:

means for locking said slide plate in said first open position.

9. A system for transporting and dispensing fluent particulate materials comprising:

a shipping container disposed with a supply of fluent particulate material, having a bottom wall with an outlet aperture, said outlet aperture being occluded by a normally disabled transfer valve;

a base container adapted for sealed attachment to the transfer valve which occludes the outlet aperture in the bottom wall of said shipping container, said base container having a top wall equipped with a sealing cover having means for enabling said normally disabled transfer valve, when said base container is properly attached to said shipping container, and for receiving material from said shipping container when said enabled transfer valve is opened by moving a slide plate to an open position, and a bottom wall which tapers downwardly to an opening having a valve for dispensing particulate material at a controlled rate when said valve is opened wherein the valve for dispensing particulate material comprises:

a housing having a funnel shaped top inlet, with a narrow inlet seat defined by its lower edge, for receiving fluent particulate material and a bottom discharge nozzle for dispensing said material;

a solenoid valve below said top inlet, said valve having a conic stop element for seating against the inlet seat and a bellows seal below said stop element for preventing entry of fluent material into the solenoid;

a flow stabilizing diffuser mounted in the bottom nozzle to eliminate pulsations of material flow due to cycling of said solenoid valve; and electrical connection means for providing electrical power to said solenoid valve.

10. The system of claim 9, wherein the valve for dispensing particulate material further comprises:

an integrated circuit signal processing board means for receiving control signals from a computer controlled chemical dispensing module on the farm implement, receiving feedback signals from the instruments of the implement together with dispensing data, and controlling dispensing rate to conform to said control signals;

means for sensing level of material in the base container and for transmitting sensed level data to said signal processing board; and means for sensing material flow from the bottom nozzle.

* * * * *